(12) United States Patent
Marsetti et al.

(10) Patent No.: US 9,422,110 B2
(45) Date of Patent: Aug. 23, 2016

(54) GUIDE DEVICE WITH WEDGE SLIDING SURFACE FOR BULK CONVEYORS

(71) Applicant: MOVEX S.p.a., Telgate (IT)

(72) Inventors: Sergio Marsetti, Viganello (CH); Matteo Marsetti, Grumello del Monte (IT)

(73) Assignee: MOVEX S.P.A., Telgate (IT)

( * ) Notice: Subject to any disclaimer, the term of this patent is extended or adjusted under 35 U.S.C. 154(b) by 0 days.

(21) Appl. No.: 14/653,736

(22) PCT Filed: Dec. 19, 2013

(86) PCT No.: PCT/IB2013/002822
§ 371 (c)(1),
(2) Date: Jun. 18, 2015

(87) PCT Pub. No.: WO2014/096939
PCT Pub. Date: Jun. 26, 2014

(65) Prior Publication Data
US 2015/0353287 A1    Dec. 10, 2015

(30) Foreign Application Priority Data

Dec. 21, 2012 (IT) .............................. AN2012A0168

(51) Int. Cl.
*B65G 15/00* (2006.01)
*B65G 21/20* (2006.01)
*B65G 47/71* (2006.01)

(52) U.S. Cl.
CPC ........ *B65G 21/2072* (2013.01); *B65G 21/2054* (2013.01); *B65G 47/71* (2013.01)

(58) Field of Classification Search
CPC .......................... B65G 21/2072; B65G 47/71
USPC .................... 198/836.1–836.4, 442
See application file for complete search history.

(56) References Cited

U.S. PATENT DOCUMENTS

| | | | | |
|---|---|---|---|---|
| 3,862,680 A | * | 1/1975 | Johnson ............... | B65G 47/682 198/454 |
| 3,934,706 A | | 1/1976 | Tice | |
| 4,962,843 A | * | 10/1990 | Ouellette ............... | B65G 13/11 193/35 R |

(Continued)

FOREIGN PATENT DOCUMENTS

| | | |
|---|---|---|
| DE | 1105298 B | 4/1961 |
| EP | 0931737 A1 | 7/1999 |

(Continued)

OTHER PUBLICATIONS

Marbett Product Catalogue 2009, Rexnord Flat Top Europe BV, Gravenzande, Holland, Aug. 2009.

(Continued)

*Primary Examiner* — William R Harp
(74) *Attorney, Agent, or Firm* — Vorys, Sater, Seymour and Pease LLP; Anthony P. Venturino (57) ABSTRACT

There is disclosed herein a guide device (1A) with a wedge sliding surface for bulk conveyors, said guide device being removably fixed to the head end of a lateral or central guide (4A) of a bulk conveyor; wherein said sliding surface is at least partially defined by a plurality of rolling bodies (5), which are idly mounted to a plurality of shafts defining axes of rotation substantially and/or generally parallel to one another and orthogonal to said axis of extension.

7 Claims, 7 Drawing Sheets

(56) References Cited

U.S. PATENT DOCUMENTS

| | | | | |
|---|---|---|---|---|
| 5,143,200 | A * | 9/1992 | Fuller | B65G 21/2054 198/453 |
| 6,079,544 | A * | 6/2000 | Donati | B65G 47/71 198/445 |
| 6,516,933 | B1 * | 2/2003 | Ledingham | B65G 21/2054 193/35 F |
| 6,561,340 | B2 * | 5/2003 | Reatti | B65G 21/2054 198/453 |
| 6,598,729 | B2 * | 7/2003 | Marsetti | B65G 39/12 193/35 R |
| 7,073,656 | B2 * | 7/2006 | Gust | B65G 47/088 198/443 |
| 7,147,098 | B2 * | 12/2006 | Ledingham | B65G 21/2054 198/417 |
| 7,637,368 | B2 * | 12/2009 | Andreoli | B65G 21/2054 193/35 C |
| 7,650,983 | B2 * | 1/2010 | Marsetti | B65G 21/2054 198/452 |
| 7,850,000 | B2 * | 12/2010 | Andreoli | B65G 21/2054 198/836.1 |
| 8,393,458 | B2 * | 3/2013 | Kaes | B65G 21/2072 198/452 |
| 2006/0086591 | A1 | 4/2006 | Gust | |

FOREIGN PATENT DOCUMENTS

| | | |
|---|---|---|
| EP | 0787 666 B1 | 4/2002 |
| EP | 0894745 B1 | 3/2003 |
| EP | 1340698 A1 | 9/2003 |
| EP | 1905708 B1 | 11/2011 |
| EP | 2399848 A1 | 12/2011 |

OTHER PUBLICATIONS

Pages from Ensalco web site, www.ensalco.com. Jun. 2005, Ensalco, Hayward California.

* cited by examiner

GUIDE DEVICE WITH WEDGE SLIDING SURFACE FOR BULK CONVEYORS

BACKGROUND

There is disclosed herein a guide device, with a wedge sliding surface, which finds application in bulk conveyors and is designed to be placed upstream from the lateral and central guides.

As used herein, the term bulk conveyors is intended to encompass belt conveyors, chain conveyors, roller conveyors and any device that defines a moving plane.

Guides are known to be used to retain and direct the items handled by the belt and chain conveyors.

The guides define sliding surfaces, which are substantially and/or generally orthogonal to the moving plane, and extend in the desired item handling direction.

The guide may extend along a path that may form a straight line, an open broken line or a curve, as needed.

Particularly, the use of lateral guides (also known as "side walls" or "roller units") and central guides (also known as "partition guides" or "double sided roller units").

The lateral guides may be placed both on sections with constant item flow direction and on sections with changing item flow direction.

The central guides are placed, for instance, at branch points of conveyor lines, i.e. where an item flow is to be divided into two distinct flows.

The lateral guides have one sliding surface only, whereas the central guides have two opposite and substantially and/or generally parallel sliding surfaces.

The sliding surfaces of the lateral or central guides are formed by a plurality of rolling bodies, which are idly mounted to parallel shafts; these rolling bodies may be, for example, cylindrical rollers, spheres or ellipsoids of revolution.

Lateral guides with idle running rollers are disclosed in patents EP 0 787 666 B1, EP 0 894 745 B1 and EP 0 931 737 A1.

Central guides with idle running rollers disposed on two opposite sides are disclosed in patents EP 1 340 698 A1 and EP 1 905 708.

The use of lateral and central guides with sliding surfaces defined by idle rolling bodies reduces friction and allows a more regular feed of the item flow, while limiting the risks of bridging.

The guides with idle rolling bodies have a first end (or head), designed to face against the item feed direction, and a second end (or tail), opposite to the first end, designed to face toward the item flow direction.

The lateral and central guides have a substantially and/or generally constant cross section.

At their heads, the guides form a "step change" of the lateral edges that define the cross section through which the flow of items handled by the conveyor moves.

This step change at the guide heads hinders the flow of the items handled by the conveyor and may also cause damages to the surfaces of the handled items, such as scores and scratches.

In order to reduce the resistance to the feed of the conveyed items at the heads of the guides, it is known to add guide devices before the guide heads, which have a substantially and/or generally wedge-shaped slide guide surface.

As used herein, the tem "wedge shaped" encompasses guide devices in which the side edges that define the cross section for the passage of at least one flow of items handled by the conveyor are modified in substantially and/or generally progressive fashion (according to a monotone function).

Particularly, the term "wedge shaped" encompasses guide devices having two symmetrically extending guide surfaces, which converge at one end and end have two parallel sections at the opposite end (such type of wedge-shaped guides being designed to be installed upstream from the central guide, relative to the flow of the conveyed items).

In this case, the converging portion of the sliding surface may have a substantially and/or generally "V" or "U" or ogival-shaped profile.

Furthermore, the term "wedge shaped" also encompasses guide devices that define a single guide surface, substantially and/or generally having an inclined, arched or semi-ogival initial section and a section parallel to the direction of extension of the guide device (in which case the wedge-shaped guide is mounted upstream from a lateral guide).

The prior art guide devices with wedge guide surfaces, located upstream from the central guides have a generally/substantially prismatic or ogival shape, or anyway have a narrow initial portion for receiving the item flow, and a wider final portion (whose width is substantially and/or generally equal to that of the central guide).

The guide devices with wedge sliding surfaces, located upstream from the lateral guides may comprise semi-ogival bodies or bodies having a constant thickness, but shaped to define an inclined or half-arch shaped surface.

The wedge guide devices with slide guide surfaces are commercially known as "separation blocks" or "side plows" or "nose plows".

Wedge-shaped guide devices for lateral or central guides are currently sold by the Italian company Rexnord Marbett s.r.l., under the names 50759 and 50760, and by the US company Solus Industrial Innovations LLC, e.g. under the names VG-686P-1.25 and VG-687NP-1.4.

Prior art guide devices with wedge slide guide surfaces still have a few drawbacks.

Particularly, they may be affected by problems such as damage to the surfaces of the handled items, or the labels on the handled items, when the items slip on the surfaces of the wedge guide devices while they are being conveyed.

An additional problem that may be encountered is the presence of irregularities in the flow of items.

The object of this invention is to obviate at least some of prior art problems and particularly those set out hereinbefore.

BRIEF DESCRIPTION OF THE DRAWINGS

Possible embodiments of the guides will be now described with reference to the accompanying drawings in which.

DETAILED DESCRIPTION

Referring to the accompanying drawings, there is disclosed a guide device 1, 1A, with a wedge guide surface 2, 2A having a head and an axis of extension X (in the illustrated examples, the axis of extension X is substantially and/or generally straight).

The guide device 1, 1A comprises means 3, 3A (as better described below), for attaching the guide device to the head end of a conventional lateral or central guide 4, 4A of a conveyor (typically a guide having sliding surfaces defined by idle rolling bodies).

For the purposes of the present disclosure, the "head" is the front part, i.e. the upstream part relative to the direction of the item flow.

The means 3, 3A for attaching the guide device 1, 1A to the head end of the lateral or central guide 4, 4A may comprise at least one clamp 3, 3A comprising two jaws 31, 32; 31A, 32A which are adapted to grip the metal core (not shown) of a lateral guide 4 or a central guide 4A.

The clamp 3, 3A is aligned with the axis of extension X and defines the "tail" of the device 1, 1A, i.e. the end portion (relative to the flow of items directed by the guide device 1, 1A).

Figure 15:
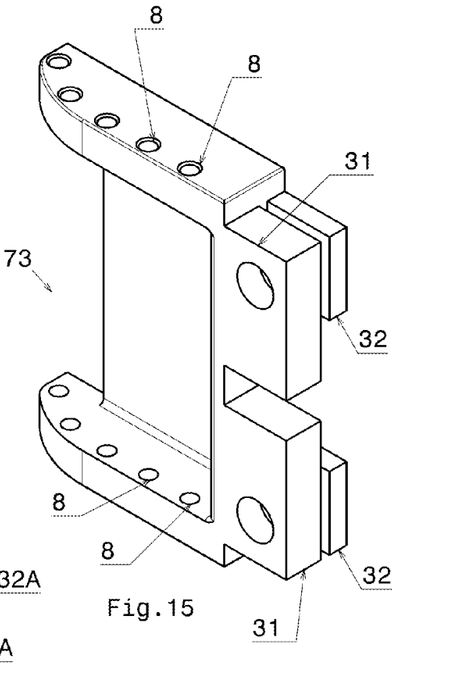
FIG. 15 is a perspective view showing a variant of the part as shown in FIG. 4.
Figure 16:
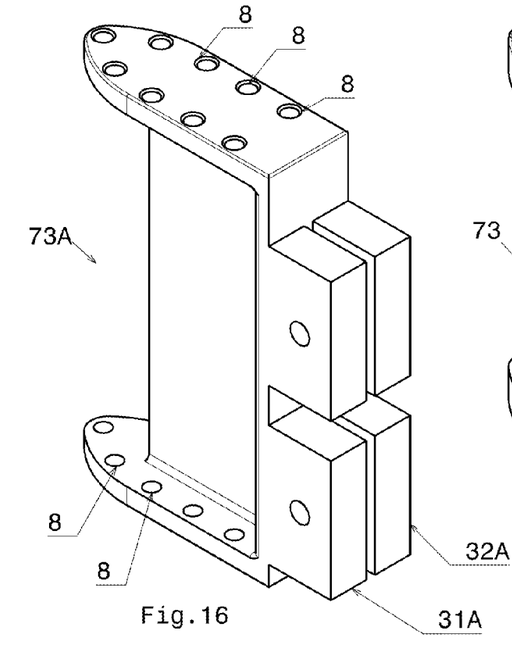
FIG. 16 is a perspective view showing a variant of the part as shown in FIG. 11.
Figure 19:
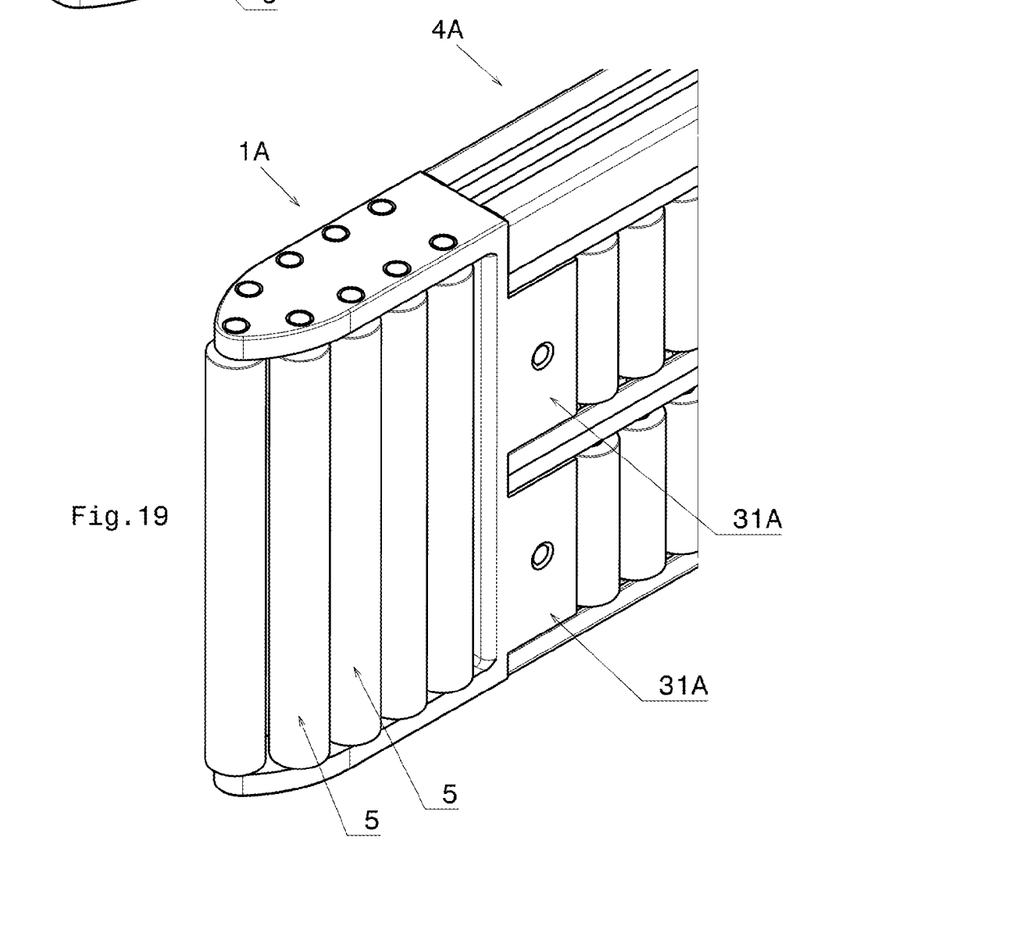
FIG. 19 is a perspective view of a further variant of the device of FIG. 1.

A single clamp 3, 3A may be sufficient for low-height guide devices, whereas higher guide devices would preferably require at least two clamps, one above the other (see for instance FIGS. 15, 16 and 19).

The two jaws 31, 32; 31A, 32A have coaxial holes 311, 321 formed therethrough, one of which is threaded, for a clamping screw (not shown) to be tightened therein.

Alternatively, a metal nut thread may be inserted in one of the two coaxial holes 311, 321 of the jaws 31, 32, for holding the clamping screw (this solution, not shown, may be preferred if the jaws are made of a polymeric material, as better described below).

The means 3, 3A for attaching the guide device 1, 1A to the lateral or central guide 4, 4A may be like those in use on the partition slide wedges of the prior art, and will not be further described herein.

One characteristic of the guide device 1, 1A is that the guide surface 2, 2A is at least partially defined by a plurality of rolling bodies 5, which are idly mounted to a plurality of substantially parallel shafts 6.

The rolling bodies 5 define at least one sliding surface 2, 2A.

The axis of rotation Y of the rolling bodies 5 is substantially and/or generally orthogonal to the direction of extension X of the device 1, as well as to the item handling direction.

In normal conditions of use, the device 1, 1A is oriented such that its axis of extension X is substantially horizontal and its axis of rotation Y is substantially vertical.

In the illustrated embodiment, the jaws 31, 32; 31A, 32A are adapted to grip a plate-like element, particularly a plate-like element extending in a plane through which the axis of extension X passes, and parallel to the axis of rotation Y of the rolling bodies 5.

Preferably, the sliding surface 2, 2A of the guide device 1, 1A is only defined by the rolling bodies 5.

This characteristic obviates the drawbacks of the prior art, and particularly avoids damages to the surfaces of the items handled by the conveyor.

In a possible embodiment, the rolling bodies 5 have a substantially and/or generally spherical or ellipsoidal shape.

In the illustrated embodiment, the substantially and/or generally spherical or ellipsoidal rolling bodies are arranged such that the rolling bodies 5 of one shaft 6 are staggered from those of the two shafts 6, 6 adjacent thereto.

Preferably, the overall dimensions of the rolling bodies 5 are smaller than the length of the shaft 6, which allows the rolling bodies 5 some freedom of movement, although limited, along the shaft 6.

With the staggered arrangement of the spheres 5, the distance between the shafts 6 may be reduced, and a more regular sliding surface may be obtained.

The staggered arrangement of the rolling bodies 5 may be obtained by placing collars 9 alternately at the lower or upper ends of the shafts 6.

The collars 9 may be formed of one piece with an underlying or overlying rolling body.

In an alternative embodiment (see FIGS. 18 and 19), the rolling bodies are cylindrical rollers.

Figure 18:
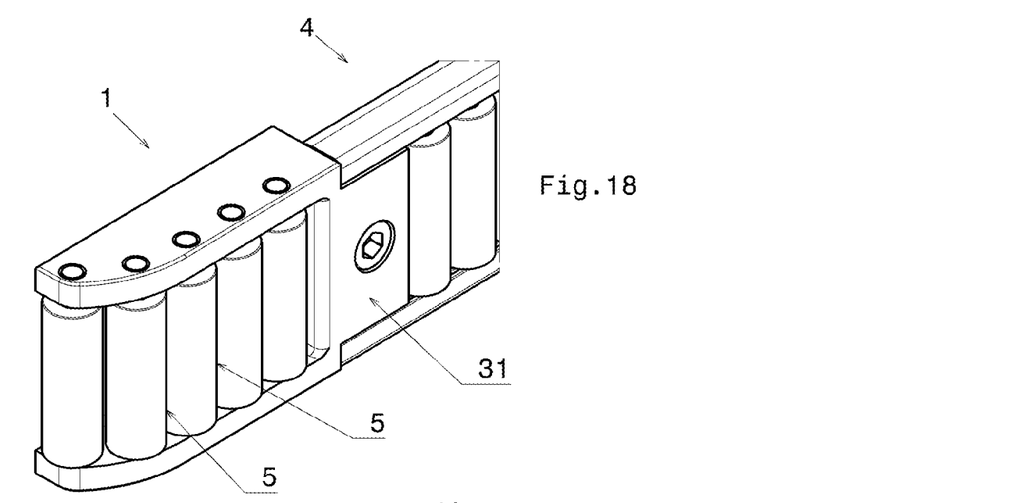
FIG. 18 is a perspective view of a variant of the device of FIG. 1.

The embodiment of FIG. 19 differs from that of FIG. 18 due to its greater height and in that two jaws are provided for fixing the guide device 1A to the central guide 4A.

The rolling bodies 6 are made of a low-friction material, e.g. polyamide, acetal resin or low-molecular weight polyethylene.

Figure 1:
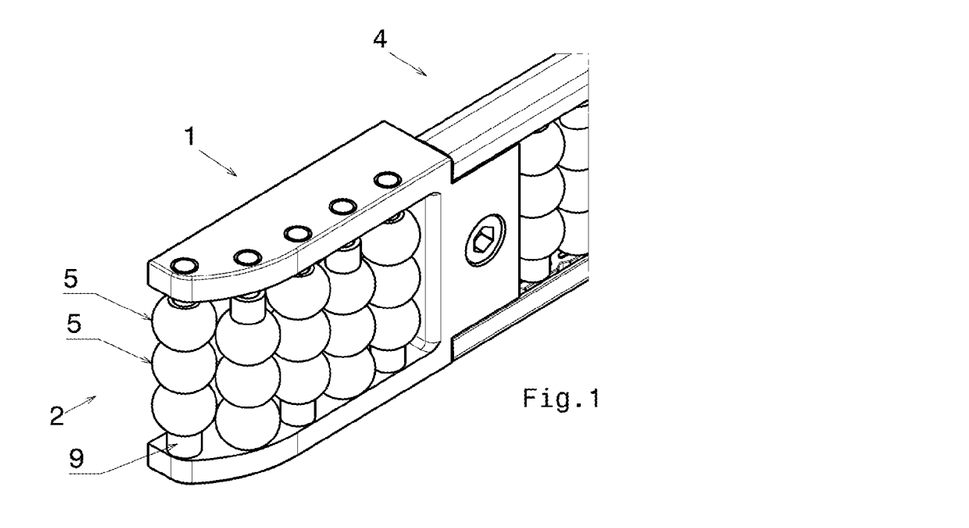
FIG. 1 is a perspective view of a guide device with a wedge sliding surface, in combination with a lateral guide.
Figure 2:
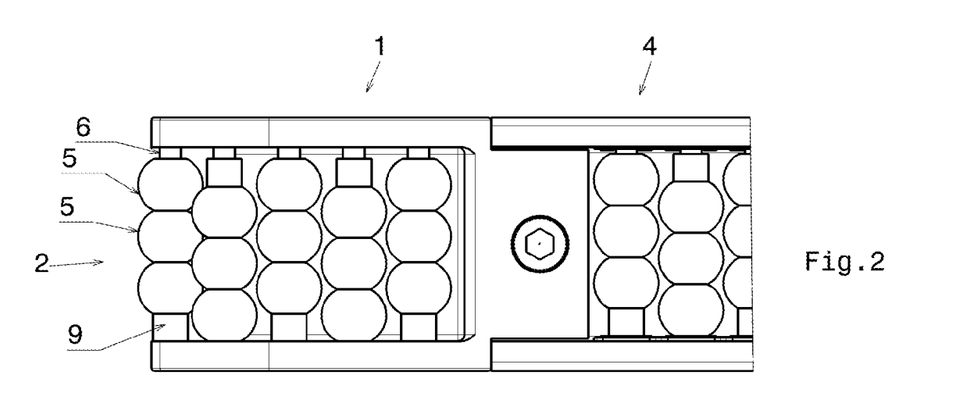
FIG. 2 is a lateral view of the assembly of FIG. 1.
Figure 3:
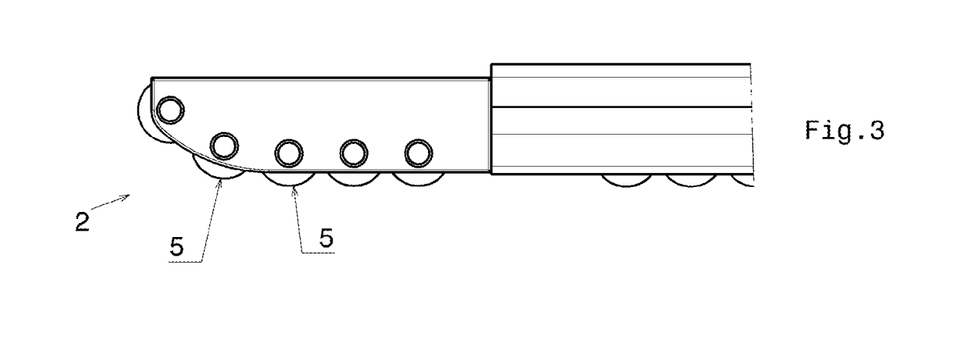
FIG. 3 is a top view of the assembly of FIG. 1.

FIGS. 1 to 3 show a first embodiment of a guide device 1 with a wedge sliding surface 2, in combination with a lateral guide 4.

The guide device 1 as shown in FIGS. 1 to 3, which is designed to cooperate with a lateral guide 5, has a sliding surface that extends on one side of the device.

The sliding surface 2 has a substantially and/or generally half-arch, e.g. semi-ogival arch shaped profile.

Figure 8:
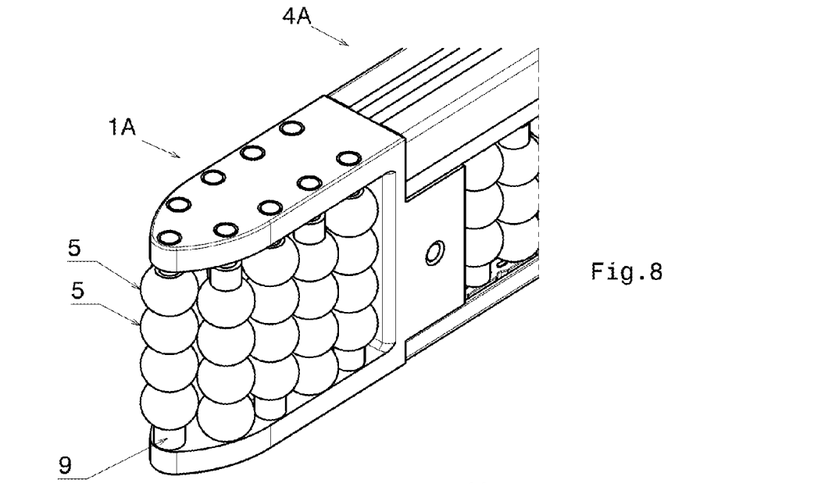
FIG. 8 is a perspective view of a second embodiment of a guide device with a wedge sliding surface, in combination with a central guide.
Figure 9:
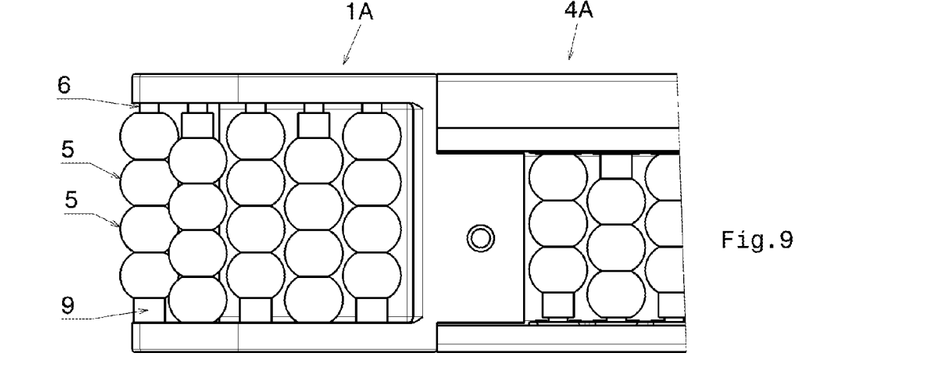
FIG. 9 is a lateral view of the assembly of FIG. 8.
Figure 10:
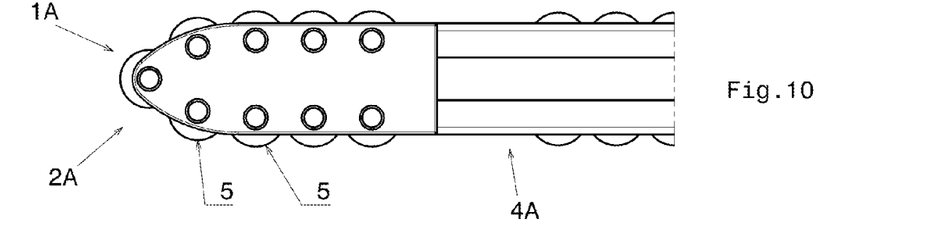
FIG. 10 is a top view of the assembly of FIG. 8.

FIGS. 8 to 10 show a guide device 1A with a wedge sliding surface 2A, in combination with a central guide 4A.

The guide device 1A as shown in FIGS. 8 to 10, which is designed to cooperate with a central guide 4A, has a sliding surface (in this example having an ogival arch-shaped profile) that extends on both sides of the device (symmetrically with respect to the axis X)

In the illustrated embodiments, the rolling bodies 5 define a substantially and/or generally semi-ogival or ogival sliding surface 2, 2A.

This choice shall be intended without limitation, the only requirement being that the profile of the sliding surface 2, 2A of the separation device 1, 1A can change the cross section of the guide device 1, 1A in substantially and/or generally progressive fashion.

In the illustrated embodiments, the guide device 1, 1A has a narrower initial portion and a wider final portion; preferably, the wider final portion is substantially flush with the sliding surface of the lateral guide 4 or the central guide 4A.

In the illustrated embodiments, the guide device 1, 1A with the wedge sliding surface 2, 2A comprises: a body 7, 7A having an axis of extension X, which comprises a U-shaped bracket, i.e. a bracket with two generally plate-like parallel and spaced elements 71, 72; 71A, 72A for fixation of the ends of the axes 6 of the rolling bodies 5.

The shafts 6 upon which the rolling bodies 5 are mounted are parallel to an axis of rotation Y orthogonal to the axis of extension X.

In the illustrated embodiments, one of the shafts 6 is placed at the tip of the wedge profile; this solution, though preferred, shall be intended without limitation.

The plate-like elements 71, 72; 71A, 72A may have seats or holes 6, arranged therein along a predetermined profile, i.e. an arched or semi-arched profile, for receiving the ends of the shafts 6.

The plate-like elements 71, 72; 71A, 72A are parallel and specular and define a wedge-shaped section.

In the illustrated embodiments (see FIGS. 3 and 10) the rolling bodies 5 partially extend out of the cross section defined by the opposed plate-like elements 71, 71; 71A, 72A.

This will prevent the items handled by the conveying system from running into the edges of the opposed plate-like elements 71, 72; 71A, 72A.

In addition to U-shaped bracket portion, the body 7, 7A also comprises a clamp portion 3, 3A for fixation thereof to a lateral or central guide 4, 4A.

In the illustrated embodiments, the jaws 31, 32; 31A, 32A of the clamp 3, 3A are adapted to grip a perforated plate-like element, particularly the metal core of a lateral guide 4 or a central guide 4A.

The transverse dimensions of the jaws 31, 32; 31A, 32A (i.e. along an axis Z orthogonal to both the axis of extension X and the axis Y) are smaller than the transverse dimensions of the rolling bodies 5.

In the illustrated embodiments, the jaws 31, 32; 31A, 32A have transverse dimensions (i.e. the dimensions along the axis Z) substantially equal to the maximum transverse dimensions of the opposed plate-like elements 71, 72; 71A, 72A.

Furthermore, in the illustrated embodiments, the jaws 31, 32; 31A, 32A have vertical dimensions (i.e. the dimensions along the axis Y) smaller than the vertical dimensions of the opposed plate-like elements 71, 72; 71A, 72A.

Figure 11:
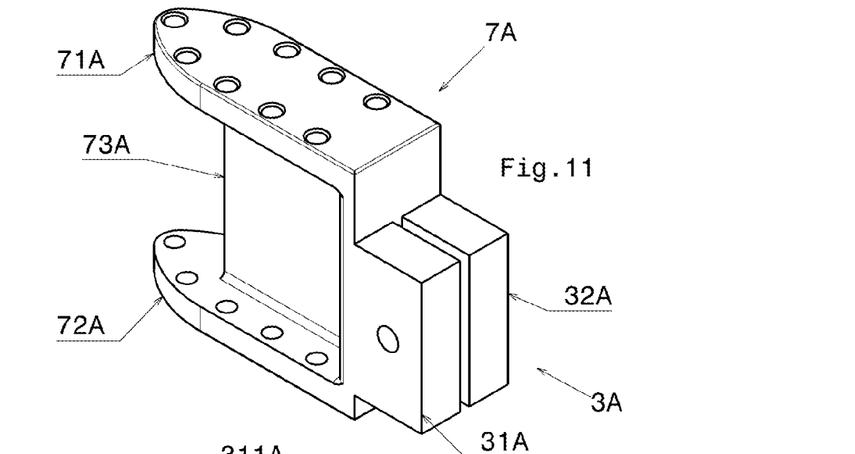
FIG. 11 is a perspective view of a part of the guide device with the wedge sliding surface as shown in FIG. 8.
Figures 12, 13:
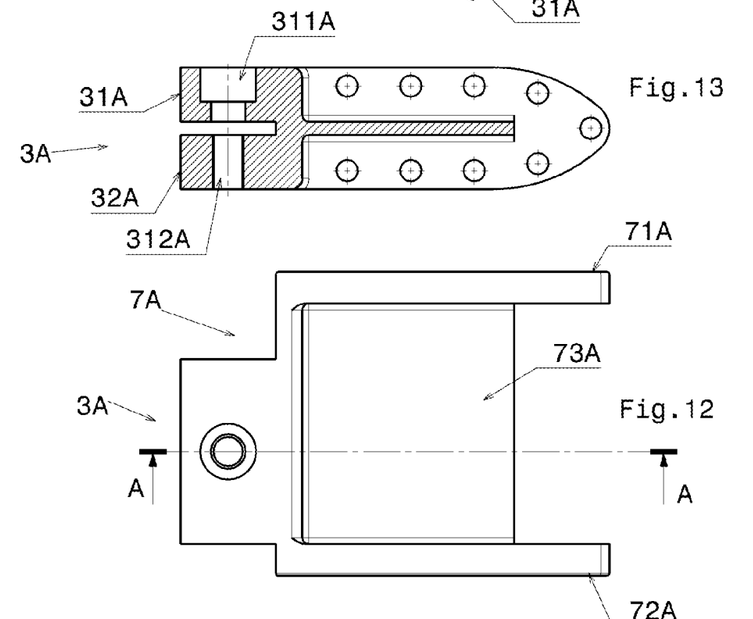
FIG. 12 is a side view of the part of FIG. 11.
FIG. 13 is a longitudinal section bottom view of the part of FIG. 11.
Figure 14:
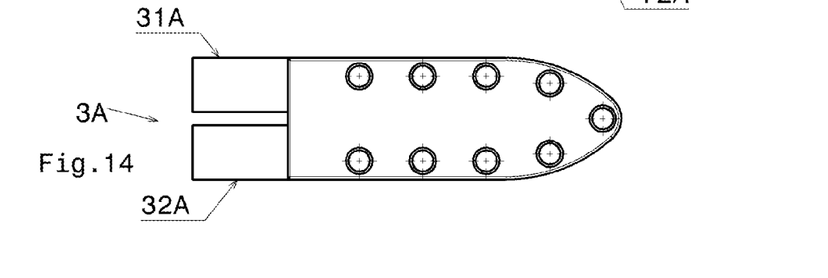
FIG. 14 is a top view of the part of FIG. 11.

In the embodiment of FIGS. 11, 12 and 13, the body 7 comprises a reinforcement wall 73A arranged along a plane of symmetry (parallel to the axis of extension X).

Figure 4:
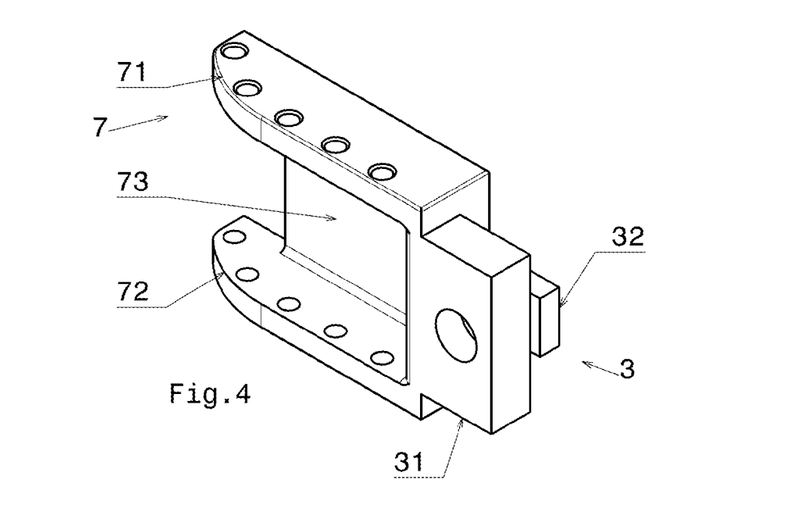
FIG. 4 is a perspective view of a part of the guide device with the wedge sliding surface as shown in FIG. 1.
Figure 5:
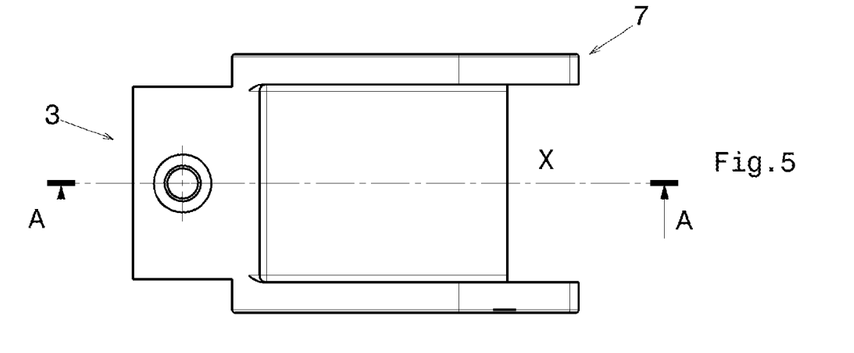
FIG. 5 is a side view of the part as shown in FIG. 4.
Figure 6:
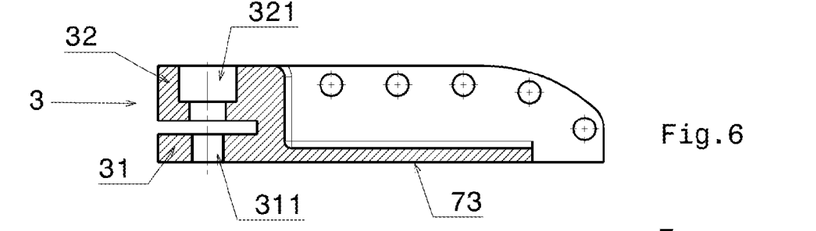
FIG. 6 is a longitudinal section bottom view of the part as shown in FIG. 4.
Figure 7:
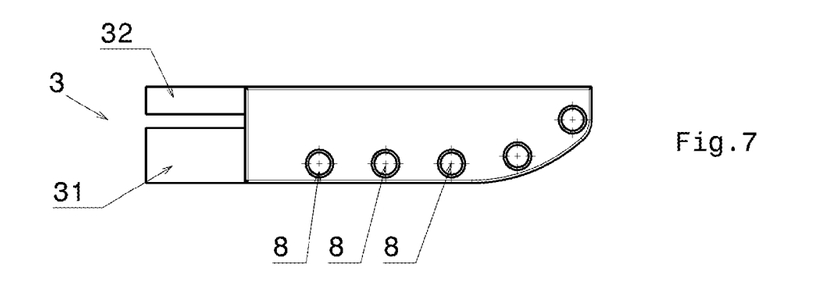
FIG. 7 is a top view of the part as shown in FIG. 4.

In the embodiment of FIGS. 4, 5 and 6, the body 7A comprises a reinforcement wall 73 that also acts as the bottom wall.

The body 7 (including the two jaws 31, 32; 31A, 32A) may be made of a polymeric material, e.g. polyamide or acetal resin, whereas the shafts 6 upon which the rolling bodies 5 are mounted may be made of steel.

FIGS. 15 and 16 show embodiments of the body 7, 7A designed for guide devices 1, 1A higher than those of FIGS. 1 and 8.

In the preferred embodiment, at least one rolling body 5 is placed "at the bow", i.e. at the tip of the wedge sliding profile, thereby more easily diverting the flow of items arriving upstream from the device 1, 1A.

In an alternative embodiment (see FIG. 17) of the body 7A (having the seats 8 of the shafts 6 formed thereon), designed for a guide device 1A, the two sliding surfaces 2A with rolling bodies 5 are separated by a "bow" or tip element 33; for instance, a rod having a substantially and/or generally triangular cross section joined to the end of the plate-like bodies 71A, 72A.

Figure 20:
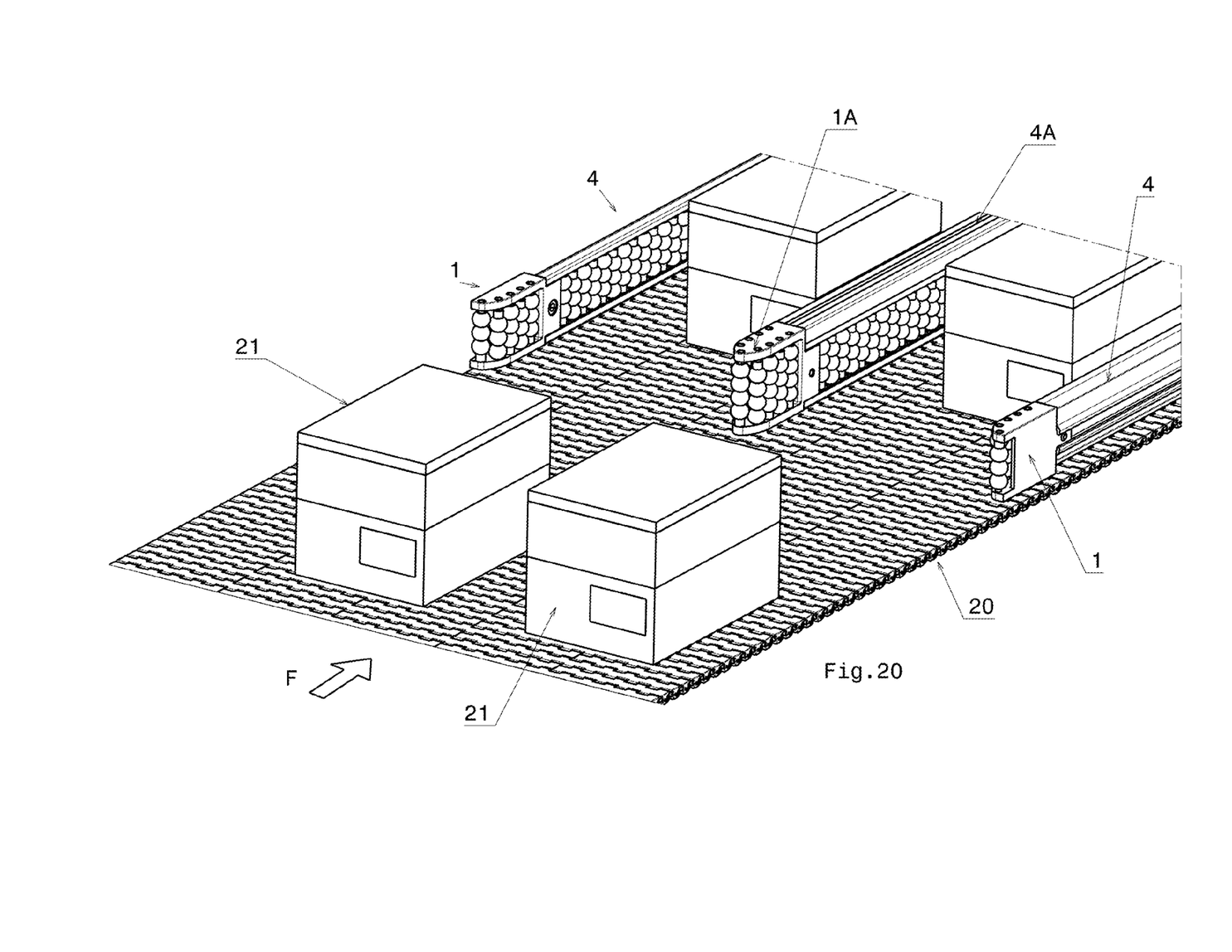
FIG. 20 shows a conveying device comprising a chain conveyor and guide devices.

FIG. 20 shows a conveyor comprising a chain carpet 20 for conveying various items (here containers 21 of generally parallelepipedal shape); the direction of movement of the carpet 20 is indicated by the arrow F.

The sides of the carpet 20 are equipped with devices of the type with the sliding surface extending on one side of the device placed upstream from lateral guides 4.

At the center of the carpet 20, there is a guide device 1A of the type with two sliding surfaces extending on two opposite sides, placed upstream from a central guide 4.

Figure 17:
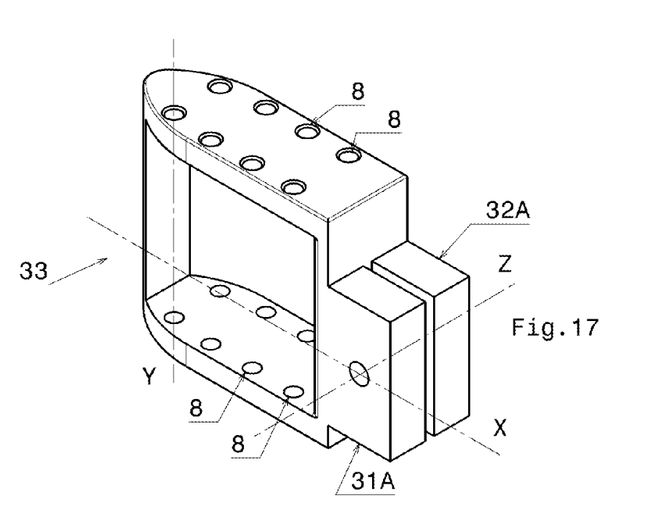
FIG. 17 is a perspective view of a further variant of the part of FIG. 11.

It shall be noted that the guide devices 1A, i.e. those designed to divide a flow of items into two flows of items (such as those as shown in FIGS. 8, 17 and 19) have symmetrical sliding surfaces 2A with respect to the axis of extension X and the idle rolling bodies 5 are disposed symmetrically with respect to the axis of extension X.

For this reason, there are equal probabilities that a moving item interfering with the guide device 1A, will be diverted to the right or to the left.

The invention claimed is:

1. A guide device defining a side sliding surface for bulk conveyors, the guide device comprising:
    a body having an (X) axis and a (Y) axis transverse to the (X) axis, the body comprising:
    two opposed plate-like elements mounted in parallel to the (X) axis the plate like elements defining a plate-edge surface extending between the edges of the plate-like elements in parallel to the (Y) axis, the plate like elements having a head end and a tail end; and,
    at least two shafts coupled between the two opposed plate-like elements, each forming a rotation axis substantially transverse to the (X) axis;
    each of the shafts having at least one rolling body rotatably mounted about its respective shaft rotation axis;
    wherein the shafts are disposed such that an outer portion of the rolling bodies, which extends away from the shaft in the direction of the plate edge surface, extends further away from the shaft than the plate edge surface extends away from the shaft in said direction of the plate edge surface, and wherein the extents of the rolling bodies defining therebetween a sliding surface for objects carried by the conveyor;
    the guide device further comprising at least one pair of mounting jaws coupled to the plate like elements and extending along the (X) axis from the tail end thereof, the mounting jaws having dimensions parallel to the (Y) axis equal to or smaller than the maximum distance between the extents of the opposed plate-like elements.

2. A guide device as claimed in claim 1, wherein when projected towards a plane orthogonal to the (Y) axis, the opposed plate like members form a shape having a tip formed between a curved edge and at least one more edge, and wherein at least one of the rolling bodies is disposed substantially in line with the tip, or having a portion thereof extending forward of the head end in the X direction.

3. A guide device as claimed in claim 1, wherein when projected towards a plane orthogonal to the (Y) axis, the opposed plate like members form a shape having a tip formed between two curved edges.

4. A guide device as claimed in claim 3, wherein at least one of the rolling bodies is disposed substantially at the tip, or having a portion thereof extending forward of the head end in the X direction.

5. A guide device as claimed in claim 1, wherein the rolling bodies are spherical, ellipsoidal, or cylindrical.

6. A guide device as claimed in claim 1, wherein at least one shaft has a plurality of rolling bodies disposed thereupon, and wherein the rolling bodies have a freedom of movement along the shaft.

7. A guide device as claimed in claim 1, wherein the rolling bodies of the two shafts are disposed in staggered arrangement.

\* \* \* \* \*